United States Patent [19]

Pounder et al.

[11] 3,758,545

[45] Sept. 11, 1973

[54] PURIFICATION OF ADIPONITRILE

[75] Inventors: Maurice George Pounder; Kenneth Ross Wilkins, both of Kingston, Ontario, Canada

[73] Assignee: Du Pont of Canada Limited, Montreal, Quebec, Canada

[22] Filed: Oct. 12, 1971

[21] Appl. No.: 188,578

[30] Foreign Application Priority Data
Oct. 15, 1970 Canada .............................. 095,669

[52] U.S. Cl. ...................... 260/465.8 R, 260/465.2
[51] Int. Cl. .......................................... C07c 121/26
[58] Field of Search ................... 260/465.8 R, 465.2

[56] References Cited
UNITED STATES PATENTS
3,496,212  2/1970  Davison et al. .............. 260/465.8 R FOREIGN PATENTS OR APPLICATIONS
928,406  5/1955  Germany...................... 260/465.8 R

*Primary Examiner*—Joseph P. Brust
*Attorney*—William A. Hoffman

[57] ABSTRACT

A process for the purification of adiponitrile wherein adiponitrile containing impurities is treated with a polymer of formaldehyde, such as paraformaldehyde, containing from about six to about one hundred formaldehyde units, to reduce the level of impurities. The treatment can be carried out at a temperature in the range of 50 to 100°C.

3 Claims, No Drawings

PURIFICATION OF ADIPONITRILE

BACKGROUND OF THE INVENTION

The present invention relates to a process for purifying adiponitrile and in particular to a one-step process for purifying adiponitrile.

One of the most important uses of adiponitrile at the present time is the preparation of hexamethylene diamine. This amine may be used as a detergent, emulsifying agent and as an intermediate in the preparation of polymers. A catalytic hydrogenation reaction is usually employed to convert the adiponitrile to hexamethylene diamine.

There are several methods for synthesizing adiponitrile such as the process of United States Pat. No. 2,200,734 issued to Arnold and Lazier on May 14, 1940 in which adipic acid is treated with ammonia in the presence of a dehydrating catalyst, and United States Pat. 2,532,311 issued to Howk and Farlow on Dec. 5, 1950 in which dicyanobutene is catalytically hydrogenated. The products produced by these reactions contain impurities, some of which boil at temperatures close to the boiling point of adiponitrile. 2-Cyanocyclopentylideneimine, hereafter referred to as CPI, is an example of this type of impurity. These close boiling impurities cannot be removed efficiently in industrial scale distillation columns. Impurities in the adiponitrile may lead to impurities in subsequent derivatives, in particular in hexamethylene diamine, that are difficult to remove. Failure to remove these latter impurities may result in inferior and variable product properties, especially of derived polymers.

One technique for the removal of the impurities in adiponitrile is to react the impurities with gaseous ozone as is described in Canadian Pat. 672,712 issued to Sawden and Bowerman on Oct. 22, 1963. Another technique described in German Pat. 928,406 issued to Trieschmann et al. on May 31, 1955 involves the addition of a 3% aqueous solution of formaldehyde followed by an aqueous washing step. Other oxidizing, acid-alkali and acid hydrolysis techniques for the purification of adiponitrile are known in the art.

STATEMENT OF THE INVENTION

It has been found that adiponitrile can be treated with a polymer of formaldehyde, as hereinafter defined, to give a large reduction in the level of impurities, especially in the level of the impurity CPI. It has also been found that a subsequent washing step is not required as the treated adiponitrile can be used for the preparation of derivatives of adiponitrile, especially catalytically hydrogenated derivatives of adiponitrile without further treatment.

The polymer of formaldehyde is one which contains from about six to about one hundred formaldehyde units, such as paraformaldehyde. The amount of formaldehyde polymer used in the treatment is governed by the initial concentration of the impurities and by the final level of impurities required. In general, an amount of formaldehyde polymer at least equal in weight to the weight of impurity to be removed is employed. The rate of treatment will tend to be lower for low concentration levels of added polymer of formaldehyde but the use of excess reagent may be uneconomical.

The temperature of the treatment is governed by the low rate of treatment at low temperatures and the decomposition of the polymer of formaldehyde, the products of the treatment or other components of the treated adiponitrile at high temperatures. A suitable temperature range is 50 to 100°C. and in particular 70 to 80°C.

From practical considerations, it is preferred that the impure adiponitrile be essentially free of ammonia. This may be accomplished by the addition of a suitable acid to obtain the impure adiponitrile in an essentially neutralized or acidic state or in particular by sparging the impure adiponitrile to remove the ammonia. In general any water that may be present in the impure adiponitrile is substantially removed prior to the treatment with the formaldehyde polymer.

According to the present invention a polymer of formaldehyde is preferably added to warmed agitated adiponitrile, said polymer of formaldehyde comprising about six to about 100 $CH_2O$ units, the upper limit being essentially determined by the ability of the polymer of formaldehyde to dissolve or to form a miscible solution with the adiponitrile being treated. The preferred polymer of formaldehyde is paraformaldehyde, which is available commercially. Paraformaldehyde is defined on page 142 of the 3rd edition of "Formaldehyde" by J. F. Walker, Reinhold (1964) as being a linear polymer of formaldehyde of the formula $HO(CH_2O)_nH$, where $n$ is in the range of about 6 to 100.

The adiponitrile containing the formaldehyde polymer is stored under continuous agitation until the impurity level, as measured by the concentration of CPI, is reduced to a level substantially below the initial level and in particular below the 500 ppm level. The adiponitrile can then be used without subsequent washing, in particular aqueous washing, for the preparation of derivatives of adiponitrile, especially hydrogenated derivatives of adiponitrile. The impurity level can be determined by any suitable analytical technique, such as gas chromatography, which was used in the following Examples.

PREFERRED EMBODIMENTS

The preferred embodiments are illustrated in the Examples to follow.

EXAMPLE I

In a full scale plant trial substantially dehydrated adiponitrile was neutralized by sparging with air before being warmed to 75°C. To the agitated adiponitrile, paraformaldehyde was added on the basis of 1.1 lb. of paraformaldehyde per 1 lb. of CPI present in the adiponitrile. The treated adiponitrile was maintained at 75°C. for 3.5 hours at which time the concentration of CPI had been reduced from an initial value of 1,360 ppm to a level of 195 ppm. The resulting treated adiponitrile was used directly without further treatment for hydrogenation to hexamethylene diamine and the resulting hexamethylene diamine substantially free of impurity was recovered by distillation.

EXAMPLE II

A further batch of neutralized adiponitrile containing 6,300 ppm of CPI was treated with paraformaldehyde at a treatment level of 1.1 lb. of paraformaldehyde per 1 lb. of CPI. The temperature of the agitated adiponitrile was initially 80°C. but over a period of 12 hours this was decreased to 50°C. The level of CPI in the adiponitrile had been reduced to 460 ppm after 4 hours and to a level of 310 ppm after a total of 12 hours treatment. The treated adiponitrile was used directly for hydrogenation to hexamethylene diamine.

We claim:

1. A process for purifying impure adiponitrile containing 2-cyanocyclopentylideneimine as a major impurity which consists essentially in treating the impure adiponitrile, the adiponitrile being essentially free of water and ammonia, at a temperature in the range of 50 to 100°C. with a polymer of formaldehyde having from about six to about one hundred formaldehyde units, the amount of formaldehyde polymer being at least about equal in weight to the reduction in weight of the impurity in the adiponitrile to be effected, and recovering the so-treated adiponitrile.

2. The process of claim 1 wherein the polymer of formaldehyde is paraformaldehyde.

3. The process of claim 2 wherein the temperature is in the range of 70 to 80°C.

* * * * *